US005313199A

United States Patent [19]

Kwon

[11] Patent Number: 5,313,199

[45] Date of Patent: May 17, 1994

[54] METHOD FOR DETECTING AND CORRECTING PULSE NOISE IN MULTIFUNCTIONAL REMOTE CONTROL TRANSMITTER

[75] Inventor: Sun-don Kwon, Seoul, Rep. of Korea

[73] Assignee: SamSung Electronics Co., Ltd., Kyungki, Rep. of Korea

[21] Appl. No.: 777,630

[22] Filed: Oct. 16, 1991

[30] Foreign Application Priority Data

Oct. 27, 1990 [KP] D.P.R. of Korea ................ 90-17285

[51] Int. Cl.[5] ................................................ H04Q 1/00

[52] U.S. Cl. .......................... 340/825.57; 340/825.69; 340/825.65

[58] Field of Search ....................... 340/825.57, 825.69, 340/825.72, 825.58, 825.63, 825.65; 375/99, 60; 358/194.1; 359/142, 146, 148; 455/353, 355; 371/32, 48, 30; 307/520; 328/120; 341/176; H04N 5/44

[56] References Cited

U.S. PATENT DOCUMENTS 4,623,887 11/1986 Welles, II ....................... 340/825.57
4,694,256 9/1987 Kawamura .......................... 328/120
4,775,840 10/1988 Ohmori et al. ...................... 307/520
4,856,081 8/1989 Smith ............................ 340/825.57
5,001,374 3/1991 Chang ............................. 307/520
5,043,723 8/1991 Araki et al. .................... 340/825.69
5,124,991 6/1992 Allen ..................................... 371/32

FOREIGN PATENT DOCUMENTS 0380371 8/1990 .

*Primary Examiner*—Donald J. Yusko
*Assistant Examiner*—Edwin C. Holloway, III
*Attorney, Agent, or Firm*—Robert E. Bushnell

[57] ABSTRACT

A method for detecting and correcting noise occurring by internal or external factors in a PPM signal waveform analyzing device such as a multifunctional remote control transmitter includes the steps of determining the existence of a carrier in a received PPM signal, detecting and correcting for a noise signal included in each signal when the carrier is present, requesting retransmission of the signal for unrestorable noise signals, and detecting and correcting for noise caused when the weakening of the PPM signal results in gaps in the received signal.

29 Claims, 6 Drawing Sheets

METHOD FOR DETECTING AND CORRECTING PULSE NOISE IN MULTIFUNCTIONAL REMOTE CONTROL TRANSMITTER

BACKGROUND OF THE INVENTION

The present invention relates to a method for detecting and correcting pulse noise in a multifunctional remote control transmitter, and particularly to a method for detecting and correcting noise caused by internal factors such as the intensity of the infrared signal or such external factors as an incandescent or fluorescent lamp, in a waveform analyzing device for pulse-phase modulated (PPM) signals, e.g., a multifunctional remote control transmitter or similar device.

FIG. 1 illustrates the construction of a conventional PPM waveform analyzing device. Referring to FIG. 1, a light receiver 1 receives a PPM signal from an outside source, and in turn provides the input to a waveform amplifier 2 which amplifies and then transmits the PPM signal to an input terminal $\overline{\text{LOAD}}$ of a counter 3, a carrier count terminal A and a first interrupt terminal $\overline{\text{INT1}}$ of a microprocessor 5. The PPM signal input to the $\overline{\text{LOAD}}$ terminal of counter 3 is counted in accordance with the clock signal applied to the clock terminal of counter 3 from a clock generator 4, and is transmitted to a second interrupt terminal INT2 of microprocessor 5 via an output terminal Qn of counter 3. The PPM signal entering light receiver 1 is either a type of signal that does not include a carrier as shown in FIG. 2Aa, or includes a carrier as shown in FIG. 3Aa. However, in practical applications, the signal which enters light receiver 1 and passes through waveform amplifier 2 will include noise as in FIGS. 2Ab and 3Ab showing noisy PPM signals (with and without the carrier respectively) caused by the internal or external factors. Accordingly, the signal fed to the first interrupt terminal $\overline{\text{INT1}}$ of microprocessor 5 includes the above noise as shown in FIGS. 2Ab and 3Ab. Microprocessor 5 receives the waveform shown in either FIGS. 2Ab or FIG. 3Ab via carrier count terminal A, and counts the number of carrier pulses in a waveform as shown in FIG. 3Ab if the carrier is present.

FIGS. 2Ac and 3Ac illustrate the waveforms of the signal which is transmitted from output terminal Qn of counter 3 to second interrupt terminal INT2 of microprocessor 5 and includes noise. As described above, the external environment or such internal factors as the intensity of the infrared remote control signal from the external source, causes noise to occur and accordingly an inaccurate remote control signal to be input to light receiver 1, creating malfunctions.

A reconfigurable remote control transmitter which inputs a multiple of remote control signals to a single transmitter, and disclosed in U.S. Pat. No. 4,623,887, provides for at least two inputs and comparisons of the remote control signal, in order to assist in the detection and correction of the noise included in the received signals. However, it is unable to completely eliminate the noise.

SUMMARY OF THE INVENTION

Therefore, to solve the above problems, it is an object of the present invention to provide an improved method for detecting and correcting pulse noise in a multifunctional remote control transmitter, which can analyze a received signal to detect and correct noise independent of the number of input signals, and to request the retransmission of only those signals distorted by unrestorable noise, so that the received signal is accurately reproduced.

To achieve the object of the present invention, there is provided a method for detecting and correcting a pulse noise in a multifunctional remote control transmitter comprising the steps of:

comparing the number of carrier pulses included in a received pulse-phase modulation signal with a set number under the initialized state of the parameters, and recognizing the existence of a carrier in the received pulse-phase modulation signal;

detecting a noise signal based on a reference for detecting a certain noise level, when the received signal is a pulse-phase modulation signal without a carrier;

correcting the detected noise signal if detected in the noise signal detecting step;

displaying a request for the retransmission of a waveform if the signals determined to be an unrestorable signal when the pulse width of the received signal in the noise signal detecting step is larger than a maximum set value, or checking the following data when the pulse width of the received signal is smaller than the maximum set value;

comparing the number of carrier pulses included in the received signal with the set number under the initialized state of the parameters which include pulse width and the number of carrier pulses, when the received signal is a pulse-phase modulation pulse with a carrier in the step of recognizing the existence of a carrier in the received pulse-phase modulation signal;

comparing the pulse width of the received signal with a certain width when the number of carrier pulses is fewer than the set number in the step of comparing the number of carrier pulses with the set number, and displaying a request for retransmission of the waveform when the "ON" pulse width is greater than the certain width, or correcting for the noise signal by determining the received signal to be a noise signal when the pulse width is smaller than the certain width;

connecting the received waveform signal to the following waveform signal when the "OFF" pulse width occurring from a weakened received signal is smaller than a certain value and when the number of carrier pulses is fewer than the certain value, or displaying a request for retransmission of the waveform when the waveform with carrier has a value greater than the maximum set value and when the "OFF" pulse width is greater than the certain value in the step of comparing the number of carrier pulses with the set number;

determining the received signal to be a noise signal when the "ON" pulse width is greater than the certain width, or when the "OFF" pulse width is smaller than the certain value, and correcting for the noise signal; and checking the following data when the maximum set value is greater than the pulse width, and finishing the process when all of the data are checked completely.

BRIEF DESCRIPTION OF THE DRAWINGS

The foregoing and other objects, advantages and aspects of the invention will be better understood from the following detailed description of the invention with reference to the accompanying drawings, in which.

DETAILED DESCRIPTION OF THE INVENTION

Figure 4A:
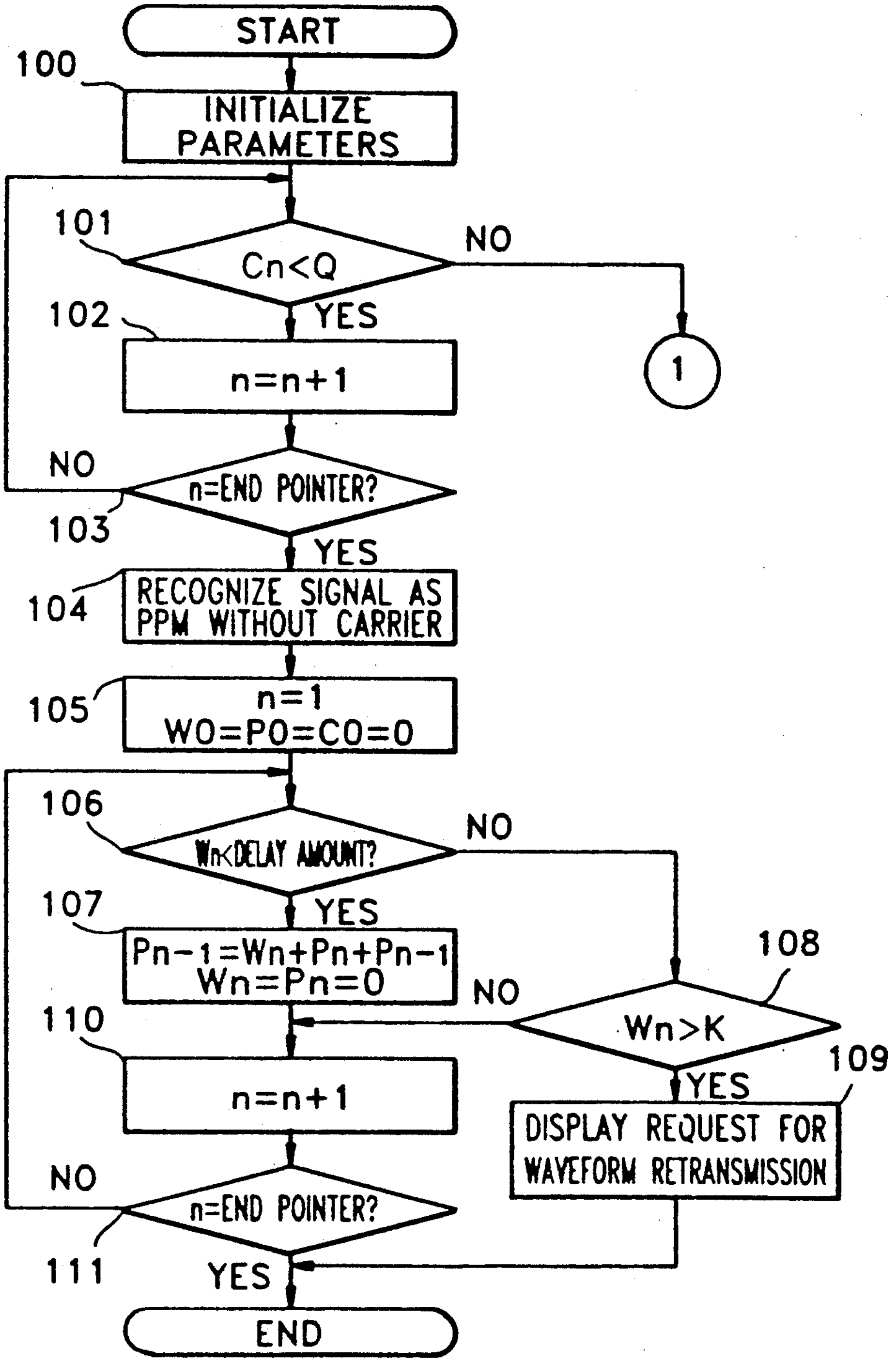
FIGS. 4A and 4B are flowcharts describing the method for detecting and correcting a pulse noise according to the present invention.
Figure 5C:
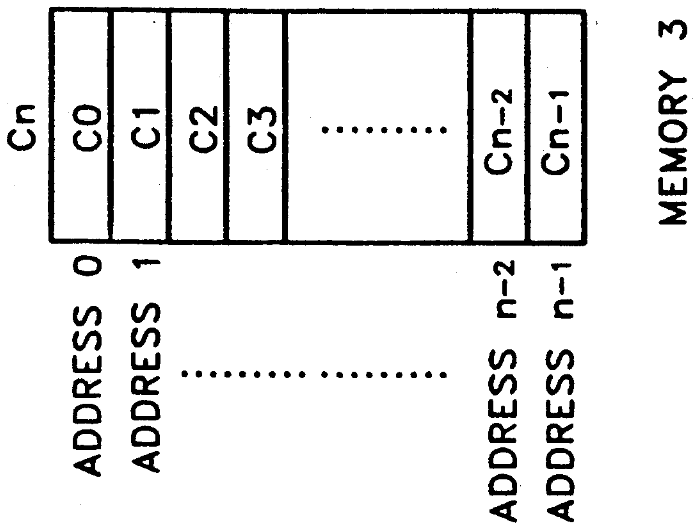
FIGS. 5A through 5C show the arrangement of certain pulse widths and the number of carrier pulses, which are stored in the memory of a microprocessor installed in the PPM waveform analyzing device illustrated in FIG. 1.
Figure 5B:
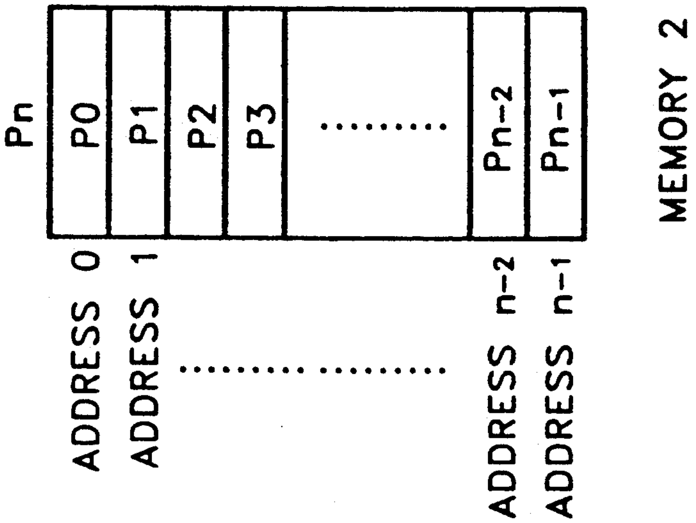
Figure 5A:
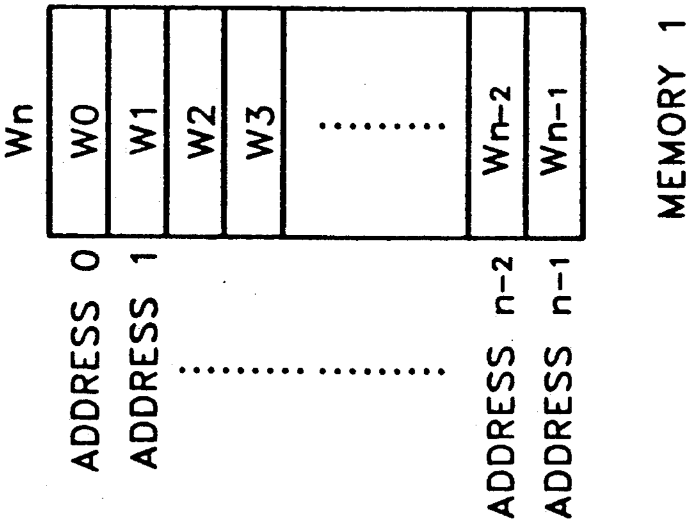

Referring to FIG. 4A, all parameters are initialized, i.e., an "ON" pulse width Wn and a number of carrier pulses Cn during an "ON" state of a received signal, and an "OFF" pulse width Pn during a pause of the received signal, in step 100. Then, in step 101, the number of carrier pulses Cn which is stored in a memory 3 illustrated in FIG. 5C and within a microprocessor 5, is compared with the set number Q.

If the number of carrier pulses Cn is fewer than the set number Q in step 101, the value of "n" is incremented by "1" in step 102, so that the next data bit (n=n+1) follows. Step 103 detects whether or not an end pointer is present at the next data bit. Here, the end pointer is an identifier for indicating the memory position of a data bit which represents the fact that all of the data n is checked.

If the next data bit is not identified as the end pointer in step 103, the program returns to step 101. Otherwise (if the next data bit is identified as the end pointer), it is recognized as a PPM pulse without a carrier in step 104. Then, the value of the pointer "n" is set to "1", and an initial "ON" pulse width W0 during an "ON" state, an initial "OFF" pulse width P0 during a pause, and an initial number of carrier pulses C0 are each set to "0", in step 105.

Figure 1:
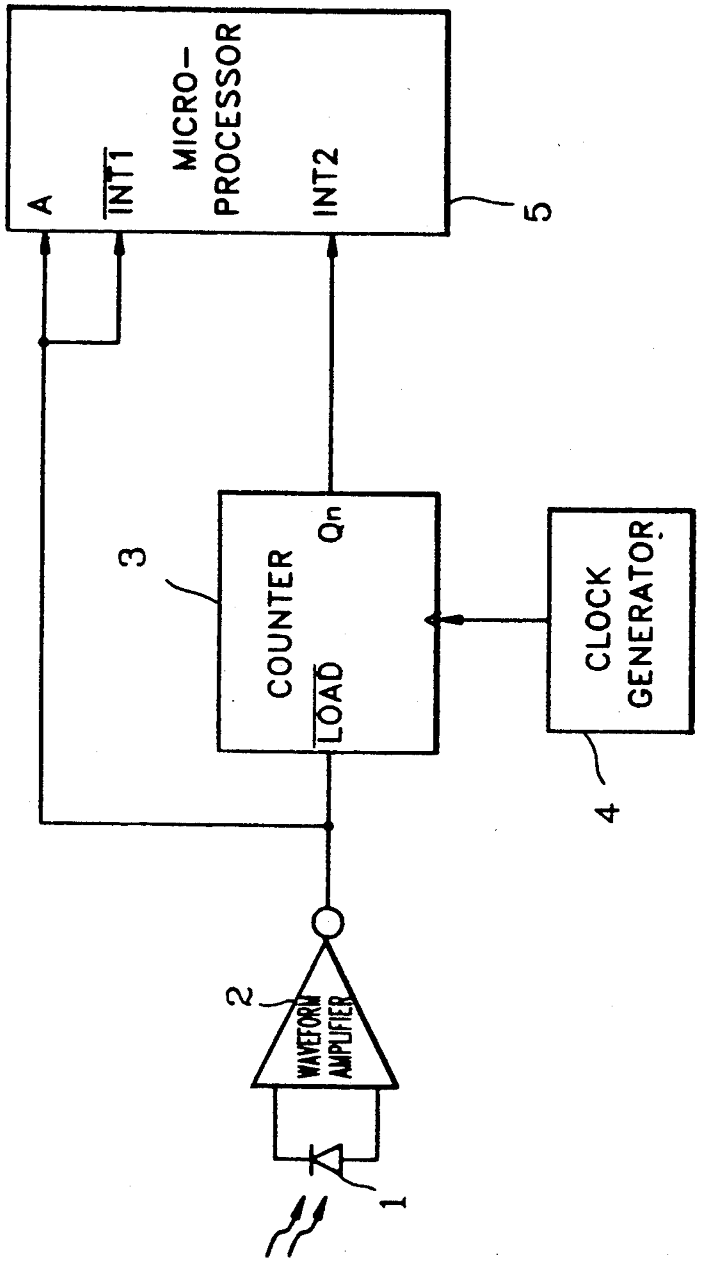
FIG. 1 is a block diagram showing the construction of a conventional PPM waveform analyzing device.

After executing step 105, it is determined whether the waveform of the nth "ON" pulse width Wn during the "ON" state is noise or not, in step 106. Due to the delay time of counter 3 shown in FIG. 1, since the value of the nth "ON" pulse width Wn is the sum of the originally input pulse width and the delayed amount in step 106, the pulse width value below the sum of the delayed amount and the minimum deviation $\alpha$ is determined as noise. At this time, it is assumed that a PPM pulse (without carrier) of which this value is smaller than or equals "$\alpha$" was not an input signal.

In step 106, when the nth "ON" pulse width Wn is shorter than the delayed amount plus "$\alpha$", the present "ON" pulse width Wn during the "ON" state and the present "OFF" pulse width Pn during the pause are added to the previous "OFF" pulse width $P_{n-1}$, and the noise signal is neglected by setting the present "ON" pulse width Wn and the present "OFF" pulse width Pn to "0", in step 107.

On the other hand, when the value of the nth "ON" pulse width Wn is greater than or equals the sum of the delayed amount and "$\alpha$" in step 106, the nth "ON" pulse width Wn is compared with the maximum set value K to determine which one is greater, in step 108.

If the value of the nth "ON" pulse width Wn is greater than the maximum set value K in step 108, it is determined that an unrestorable waveform resulting from intense optical noise is input, then a request for retransmission of the pulse waveform is displayed, in step 109.

When step 107 is executed, or the nth "ON" pulse width Wn equals or is shorter than the maximum set value K in the step 108, the value of n is incremented by 1 to proceed to the next data bit. Then, step 111 determines whether or not all the data is checked by detecting (or not detecting) the end pointer. If the checking of the whole data string is not completed in step 111, the program returns to step 106; otherwise, the program is finished.

Figure 4B:
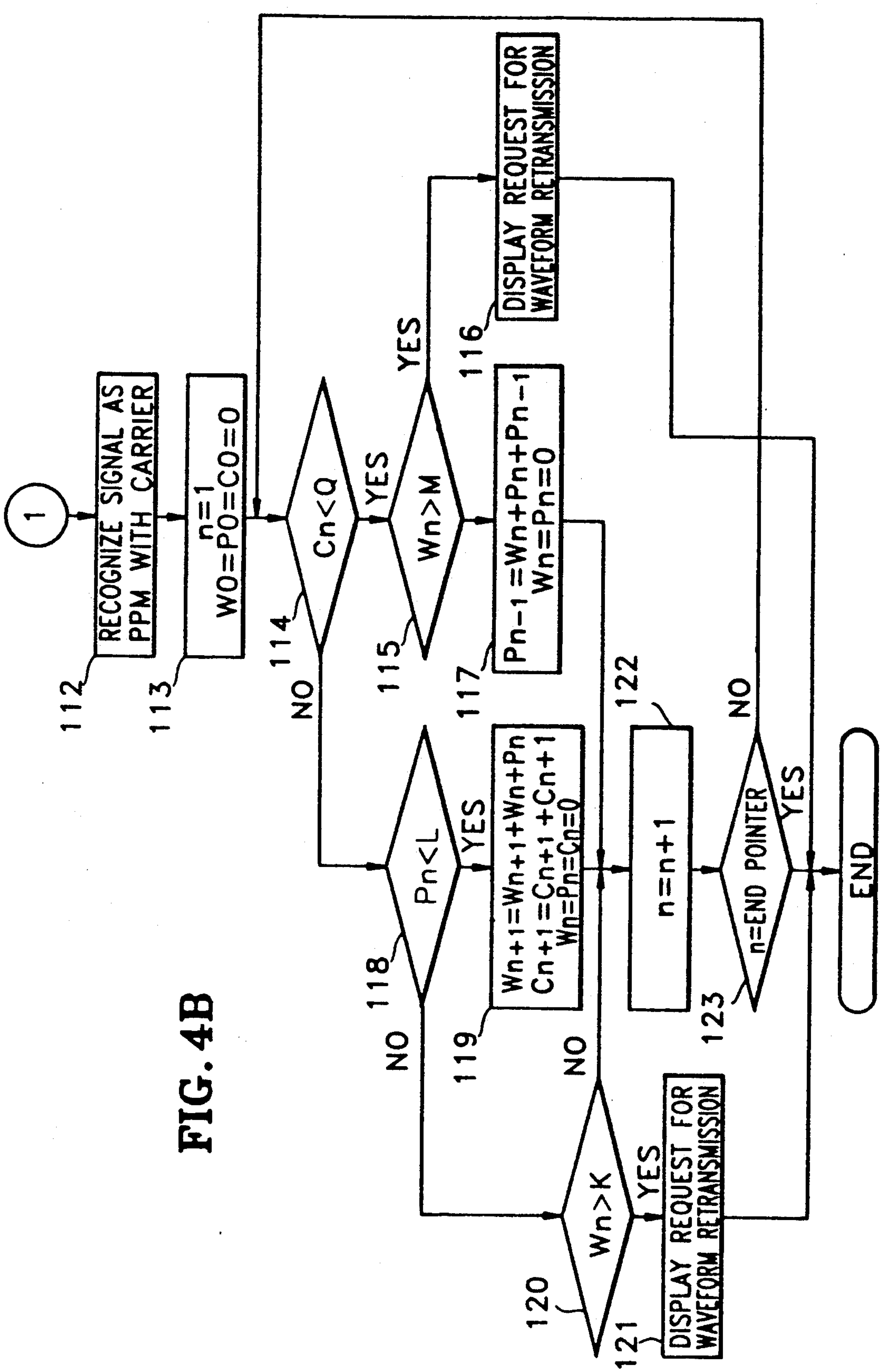

On the other hand, as illustrated in FIG. 4B, when the number of carrier pulses Cn equals or is greater than the set number Q, the PPM pulse is recognized as a pulse with carrier in step 112. After performing step 112, the value of the pointer n is set to "1", and the initial "ON" pulse width W0, the initial "OFF" pulse width P0 and the initial number of carrier pulses C0 are cleared to "0" in step 113. Then, the number of carrier pulses Cn included in the received signal is compared with the set number Q in step 114. If the number of carrier pulses Cn is smaller than the set number Q in step 114, the nth "ON" pulse width Wn is checked to determine whether or not it is larger than a certain width M in step 115. If the nth "ON" pulse width Wn is greater than the certain width M in step 115, the programs displays a request for retransmission of the pulse waveform in step 116. This is because the nth "ON" pulse width Wn being longer than the certain width M means that the received waveform signal is not a PPM pulse with carrier.

If the nth "ON" pulse width Wn is smaller than or equals the certain width M, the present nth "ON" pulse width Wn during the "ON" state and the nth "OFF" pulse width Pn are added to the previous "OFF" pause pulse width $P_{n-1}$, and the present nth "ON" pulse width Wn and the nth "OFF" pulse width Pn all are again cleared to "0", in step 117.

On the other hand, if the number of carrier pulses Cn is greater than or equals the set number Q in step 114, a PPM pulse with carrier is deemed present. At this time, the program determines whether or not the "OFF" pulse width Pn is smaller than a certain value L, in step 118. Here, step 118 provides the program with a means for connecting a discontinuous waveform segments, for when parts of the carrier in the "ON" pulse width Wn are not detected due to the weakening of the received signal. A sample of such a a discontinuous waveform is shown in FIG. 3Ab.

In step 118, when the "OFF" pulse width Pn is below the certain value L, the next "ON" pulse width $W_{n+1}$ and the "OFF" pulse width Pn are added to the present "ON" pulse width Wn. Then, in step 119, the present "ON" pulse width Wn, the "OFF" pulse width Pn and the number of the carrier pulses Cn are all cleared to "0", while the present number of carrier pulses Cn plus one is added to the next number of carrier pulses $C_{n+1}$.

Figures 2A, 2B:
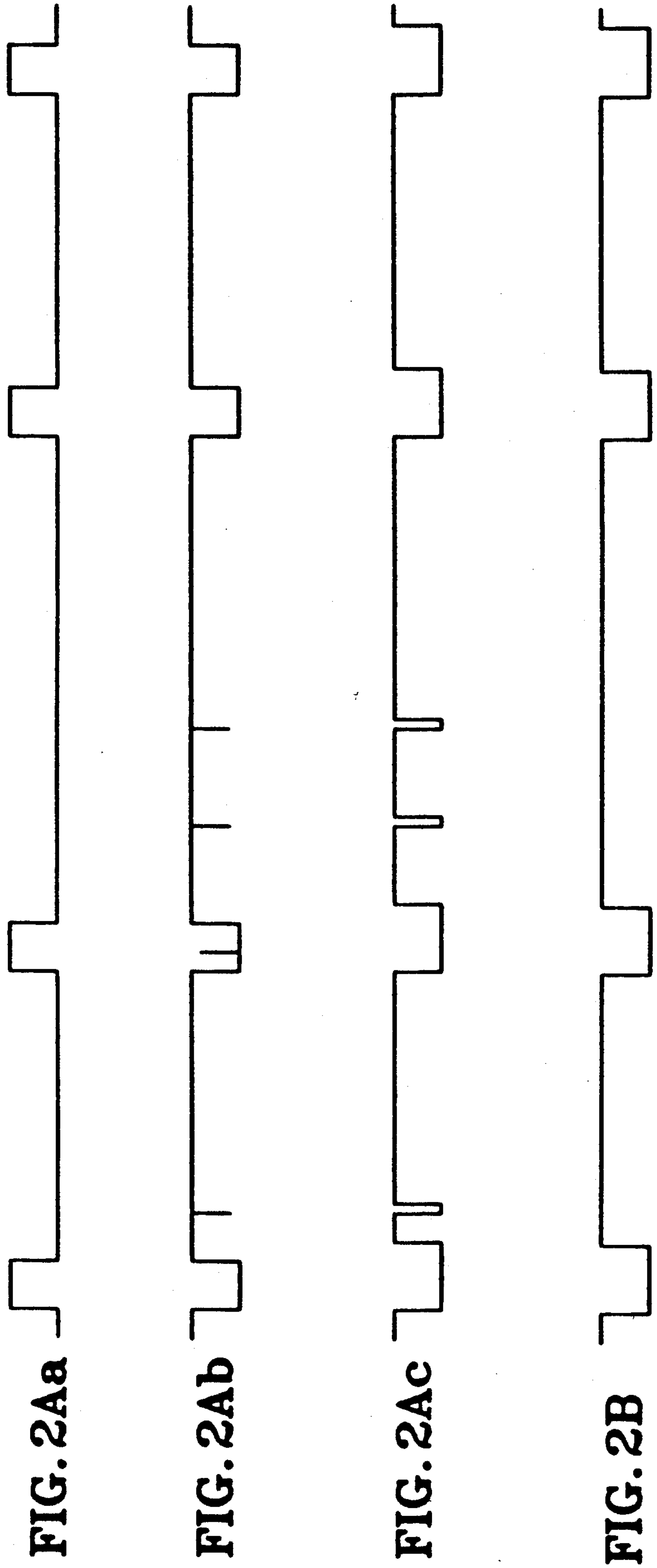
FIGS. 2Aa through 2Ac show the waveforms of PPM pulse signals processed in a PPM waveform analyzing device without a carrier.
FIG. 2B shows a waveform obtained after performing a method for detecting and correcting a pulse noise according to the present invention.
Figures 3A, 3B:
FIGS. 3Aa through 3Ac show waveforms of PPM pulses processed in a PPM waveform analyzing device with a carrier.
FIG. 3B also shows a waveform obtained after performing a method for detecting and correcting a pulse noise according to the present invention.

When all the above-mentioned steps are carried out, noise is eliminated as illustrated in FIGS. 2B and 3B.

In the above program, when the "OFF" pause pulse width Pn is greater than or equals the certain value L in step 118, it is checked whether the "ON" pulse width Wn is larger than the maximum set value K in step 120. When the program determines that the "ON" pulse width Wn is larger than the maximum set value K, a request for retransmission of the pulse waveform is displayed in step 121.

After performing step 117 or step 119, or if the "ON" pulse width Wn is smaller than or equals the maximum set value K, the value of n is incremented by 1 in step 122 to proceed to the next data bit. Then, step 123 determines whether or not all the data has been checked by checking the value of the end pointer. At this time, if all of the data were not checked in step 123, the program returns to step 114, and if it has, the program is finished.

Step 120 provides a process for analyzing the data when a long waveform is produced by an adjacent intense optical noise during the inputting of a carrier, and for determining whether the waveform is unrestorable or not, even though the "OFF" pulse width Pn is greater than the certain value L in step 118.

According to the present invention, the received signal is repeatedly analyzed independent of the number of input signals, noise is detected and corrected, and the re-input operation is performed only for unrestorable noise signals so that noise can be eliminated by a single input operation.

What is claimed is:

1. A method for detecting and correcting pulse noise in a multifunctional remote control transmitter, said method comprising the steps of:

comparing a number of carrier pulses included in a received pulse-phase modulation signal with a set number to determine existence of a carrier in said received pulse-phase modulation signal on the basis of the comparison;

detecting a pulse width of a noise signal based on a comparison to a reference value to detect a certain noise level when said received pulse-phase modulation signal is a pulse-phase modulation signal without a carrier;

correcting the detected noise signal if detected in said noise signal detecting step;

generating a request for retransmission in response to determining said received pulse-phase modulation signal as an unrestorable signal when said pulse width of said noise signal is larger than a maximum set value;

comparing said number of carrier pulses included in said received pulse-phase modulation signal with said set number when said received pulse-phase modulation signal is determined to be a pulse-phase modulation signal with a carrier in said step of determining the existence of said carrier in said received pulse-phase modulation signal;

comparing an "ON" pulse width of said received pulse-phase modulation signal with said carrier to a certain width when said number of carrier pulses is less than said set number and generating a request for retransmission when said "ON" pulse width is greater than said certain width, and correcting a noise signal when said "ON" pulse width is smaller than said certain width; and connecting an "OFF" pulse width occurring from a weakened received signal when said "OFF" pulse width is smaller than a certain value, and generating a request for retransmission when said "ON" pulse width is greater than the maximum set value and said "OFF" pulse width is greater than said certain value.

2. A method for detecting and correcting pulse noise in a multifunctional remote control transmitter as claimed in claim 1, wherein said step of determining the existence of a carrier in said pulse-phase modulation pulse recognizes said pulse-phase modulation pulse with a carrier when number of carrier pulses is greater than said set number.

3. A method for detecting and correcting a pulse noise in a multifunctional remote control transmitter as claimed in claim 1, wherein said step of detecting a noise signal includes initializing a pointer to when the received signal is a pulse-phase modulation signal without a carrier.

4. A method for detecting and correcting pulse noise in a multifunctional remote control device, said method comprising iteratively;

comparing a count of carrier pulses of a received waveform stored at a current address with a predetermined value;

when said count of said carrier pulses exceeds said predetermined value, connecting discontinuities in said received waveform;

when said count of said carrier pulses are less than said predetermined value, removing anomalous changes in said received waveform; and one of: incrementing said current address and looping to said comparing step, and exiting if said current address is a last address.

5. A method as claimed in claim 4, wherein said removing anomalous changes comprises:

comparing an on pulse width stored at said current address with a predetermined on width; and if said on pulse width of said current address is less than said predetermined on width, adding said on pulse width of said current address and an off pulse width of said current address to an off pulse width of an adjacent address.

6. A method as claimed in claim 5, further comprising if said on pulse width of said current address is greater than a predetermined maximum on width, requesting retransmission.

7. A method as claimed in claim 4, wherein said received waveform is a pulse-phase modulated signal.

8. A method as claimed in claim 6, wherein said received waveform is a pulse-phase modulated signal.

9. A method as claimed in claim 4, wherein said connecting discontinuities comprises:

comparing an off pulse width stored at said current address with a predetermined off width; and if said off pulse width of said current address is less than said predetermined off width, adding said off pulse width of said current address and an on pulse width of said current address to an on pulse width stored at an adjacent address.

10. A method as claimed in claim 9, further comprising if said off pulse width of said current address is greater than said predetermined off width, requesting retransmission of said received waveform.

11. A method as claimed in claim 10, wherein said received waveform is a pulse-phase modulated signal.

12. A method for detecting and correcting for pulse noise in a multifunctional remote control device, said method comprising iteratively:

comparing a length of an on pulse width of a current address to a minimum predetermined value;

when said length exceeds said minimum predetermined value, requesting retransmission if said length exceeds a maximum predetermined value;

when said length is less than said minimum predetermined value, adding said on pulse width of said current address and an off pulse width of said current address to an off pulse width of a previous address;

one of: incrementing said current address and looping to said comparing step, and exiting if said current address is a last address.

13. A method for detecting and correcting for pulse noise in a multifunctional remote control device, said method comprising:

successively comparing a count of carrier pulses of a received waveform stored at a plurality of addresses with a predetermined set value to determine whether said waveform comprises a carrier;

if said waveform comprises said carrier, then iteratively:

comparing a count of carrier pulses of a received waveform stored at a current address with said predetermined set value, when said count of said carrier pulses exceeds said predetermined set value, connecting discontinuities in said received waveform, when said numbers of said carrier pulses are less than said predetermined set value, removing anomalous changes in said received waveform, and one of: incrementing said current address and looping to said comparing said count step, and exiting if said current address is a last address; and if said waveform does not have said carrier:

comparing a length of an on pulse width of said current address to a minimum predetermined value, when said length exceeds said minimum predetermined value, requesting retransmission if said length exceeds a maximum predetermined value, when said length is less than said minimum predetermined value, adding said on pulse width of said current address and an off pulse width of a current address to an off pulse width of a previous address, and one of: incrementing said current address and looping to said comparing said length step, and exiting if said current address is a last address.

14. A method as claimed in claim 13, wherein said removing anomalous changes comprises:

comparing said on pulse width stored at said current address with a predetermined on width; and if said on pulse of said current address is less than said predetermined on width, adding said on pulse width of said current address and an off pulse width of said current address to an off pulse width of an adjacent address.

15. A method as claimed in claim 14, further comprising if said on pulse width of said current address is greater than said predetermined on width, requesting retransmission.

16. A method as claimed in claim 13, wherein said received waveform is a pulse-phase modulated signal.

17. A method as claimed in claim 14, wherein said received waveform is a pulse-phase modulated signal.

18. A method as claimed in claim 13, wherein said connecting discontinuities comprises:

comparing said off pulse width stored at said current address with a predetermined off width; and if said off pulse width of said current address is less than said predetermined off width, adding said off pulse width of said current address and said on pulse width of said current address to an on pulse width stored at an adjacent address.

19. A method for detecting and correcting pulse noise received by a remote control device, said method comprising:

comparing counts of carrier pulses of a received waveform with a predetermined value;

when said counts of said carrier pulses exceed said predetermined value, checking widths of off-pulses and generating a corrected waveform by removing pulse noise discontinuities in said received waveform; and when said counts of said carrier pulses are less than said predetermined value, checking widths of on-pulses and generating said corrected waveform by removing anomalous changes in said received waveform.

20. A method as claimed in claim 19, further comprised of removing anomalous changes by:

comparing widths of said on-pulses with a predetermined on-width; and generating said corrected waveform by changing said on-pulses of said received waveform to off-pulses and incorporating the changed said off-pulses into adjacent off-pulses, when said widths of said on-pulses are less than said predetermined on-width.

21. A method as claimed in claim 20, further comprising requesting retransmission of said received waveform when said widths of said on-pulses are greater said predetermined on-width.

22. A method as claimed in claim 19, wherein said received waveform is a pulse-phase modulated signal.

23. A method as claimed in claim 19, wherein said further comprised of removing pulse noise discontinuities by:

comparing widths of said off-pulses with a predetermined off-width; and generating said corrected waveform by changing said off-pulses to on-pulses and incorporating the changed said on-pulses into adjacent on-pulses, when said off-pulses are less than said predetermined off-width.

24. A method as claimed in claim 23, further comprising requesting retransmission of said received waveform when said off-pulses are greater than a predetermined maximum set off-width value.

25. A method as claimed in claim 20, further comprised of pulse noise discontinuities by:

comparing widths of said off-pulses with a predetermined off-width; and generating said corrected waveform by changing said off-pulses to on-pulses and incorporating the changes said on-pulses into adjacent on-pulses, when said off-pulses are less than said predetermined off-width.

26. A method for detecting and correcting for pulse noise in a remote control device, said method comprising:

comparing widths of on-pulses of a received waveform to a minimum predetermined value for an on-pulse;

requesting retransmission, when said widths of said on-pulses exceed said minimum predetermined value for an on-pulse and exceed a maximum predetermined set value on-pulse width; and generating a corrected waveform by changing said on-pulses to off-pulses and adding the changed said off-pulses to adjacent off-pulses, when said widths are less than said minimum predetermined value for an on-pulse.

27. A method for detecting and correcting pulse noise in a remote control device, said method comprising:

successively comparing counts of carrier pulses of a received waveform with a predetermined set value to determine whether said waveform comprises a carrier;

when said waveform is determined to not comprise said carrier;

comparing a widths of on pulses of said received waveform to a minimum predetermined value for an on-pulse;

requesting retransmission when said widths of said on-pulses exceed said minimum predetermined value for an on-pulse and exceed a maximum predetermined set value on-pulse width; and generating a corrected waveform by changing said on-pulses to off-pulses and adding the changed said off-pulses to adjacent off-pulses, when said widths are less than said minimum predetermined value for an on-pulse; and when said waveform does comprise said carrier;

comparing counts of carrier pulses of a received waveform with a predetermined value;

when said counts of said carrier pulses exceed said predetermined value, checking widths of off-pulses and generating a corrected waveform by removing pulse noise discontinuities in said received waveform; and when said counts of said carrier pulses are less than said predetermined value, checking widths of said on-pulses and generating said corrected waveform by removing anomalous changes in said received waveform.

28. A method as claimed in claim 27, wherein said removing anomalous changes comprises:

comparing widths of said on-pulses with a predetermined on-width; and generating said corrected waveform by changing said on-pulses of said received waveform to off-pulses and incorporating the changed said off-pulses into adjacent off-pulses, when said widths of said on-pulses are less than said predetermined on-width.

29. A method as claimed in claim 27, further comprised of removing pulse noise discontinuities by:

comparing widths of said off-pulses with a predetermined off-width; and generating said corrected waveform by changing said off-pulses to on-pulses and incorporating the changed said on-pulses into adjacent on-pulses, when said off-pulses are less than said predetermined off-width.

* * * * *

UNITED STATES PATENT AND TRADEMARK OFFICE

CERTIFICATE OF CORRECTION

PATENT NO. : 5,313,199

DATED : May 17, 1994

INVENTOR(S) : Sun-Don Kwon

It is certified that error appears in the above-indentified patent and that said Letters Patent is hereby corrected as shown below:

Column 2, Line 32, change "signal" to --pulse--;

IN THE CLAIMS

Column 7, Line 54, after "pulse" insert --width--:

Signed and Sealed this

Nineteenth Day of August, 1997

Attest:

Bruce Lehman

BRUCE LEHMAN

*Attesting Officer* *Commissioner of Patents and Trademarks*